United States Patent Office 3,608,178
Patented Sept. 28, 1971

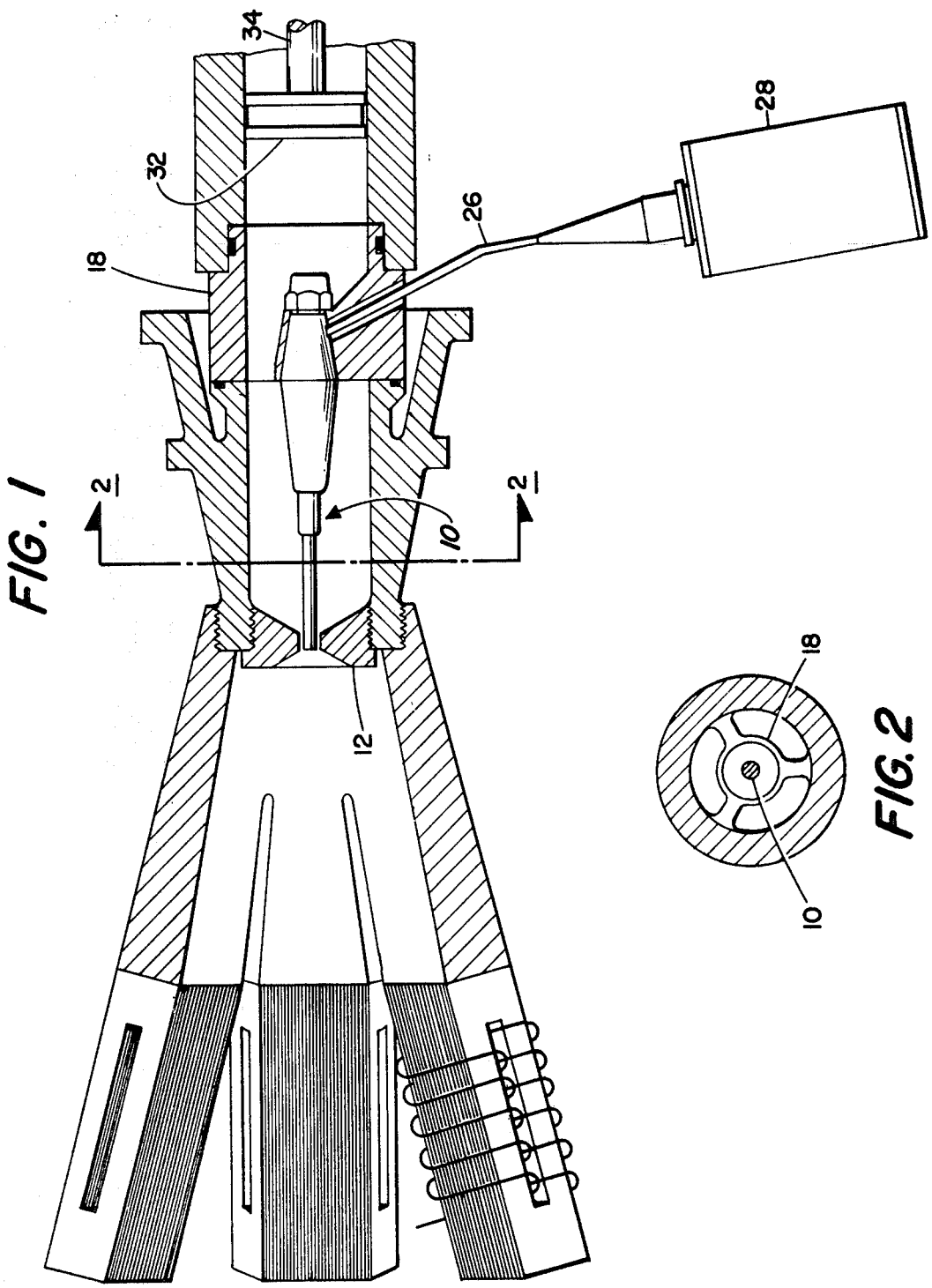

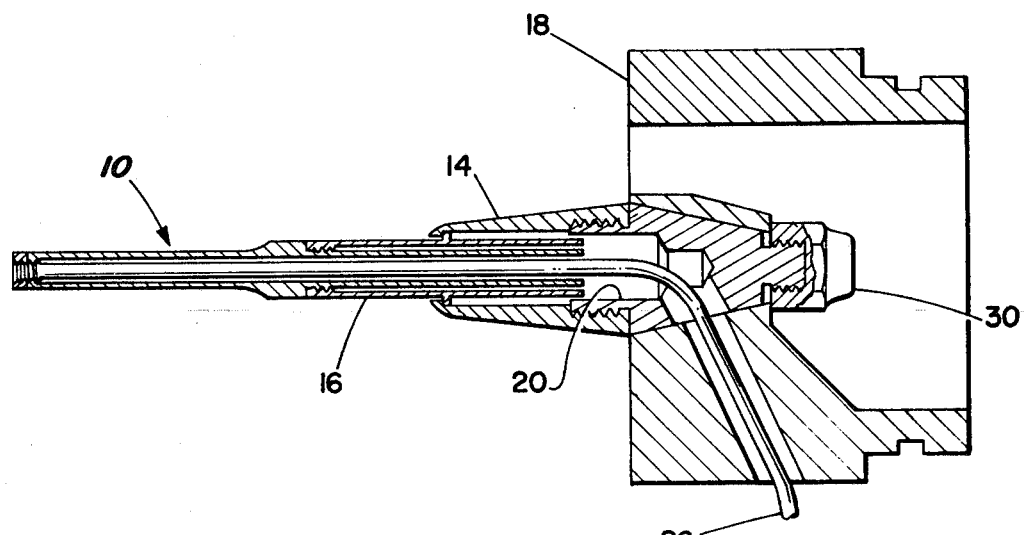
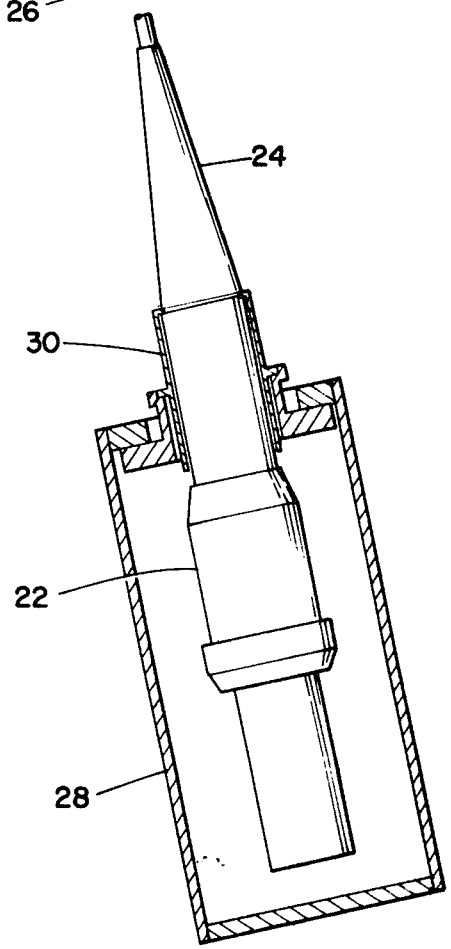
FIG.3

3,608,178
PROCESS FOR PRODUCING ELONGATED
OBJECTS FROM POWDERED METALS
Herbert Kartluke, Harold Lawrence McKaig, Jr., and
William B. Tarpley, Jr., West Chester, Pa., assignors
to Aeroprojects Incorporated, West Chester, Pa.
Filed Nov. 25, 1969, Ser. No. 879,643
Int. Cl. B22f 3/24
U.S. Cl. 29—420.5                                12 Claims

ABSTRACT OF THE DISCLOSURE

One or more powdered metals, elemental or alloy, are mixed with a plasticizer and binder. The mixture is extruded into solid or hollow shapes using an ultrasonically activated extruder. The shape is then dried and sintered. Thereafter, the sintered shape is cold worked, such as by drawing the shapes on an ultrasonically activated draw bench, to increase its density and mechanical properties.

The present invention is useful in the process for producing elongated objects of varying shapes including sections, solid rods, and hollow tubes. For purposes of disclosing the preferred embodiment, and not by way of limitation, the following relates to the process for producing a specific shape, namely hollow tubes.

In large thermal equipment, extreme lengths of tubing are frequency utilized. For example, an evaporative or distillation type desalination plant may incorporate miles of metal tubing to provide large heat transfer surfaces. It has been estimated that two-thirds of the cost of the copper-nickel tubing for use in a desalination plant is attributable to the manufacture of such tubing. A modest reduction in manufacturing costs will represent a substantial saving. Little or nothing can be done to control the cost of the raw materials.

Spider supported mandrels to permit extrusion of hollow objects are common in extrusion apparatus, but they normally do not utilize ultrasonics. The ultrasonic mandrel drive system herein disclosed permits optimum utilization of ultrasonic energy by combining excitation of the mandrel with excitation of the die, the latter having been previously disclosed in U.S. Pat. No. 3,203,215. Both systems are supplied with high frequency electrical power from a frequency converter (not shown) and may be at different frequencies.

In accordance with the present invention, the desired shape, such as a hollow tube, is attained in the following manner. One or more powdered metals which may be elemental or alloys are mixed with an extrusion vehicle or carrier which provides a plasticizing and binder action. The plasticizer and binder serve to prevent separation of fluid (which may be water or a non-aqueous liquid) and metal powder particles when pressure is applied. The plasticizer/binder also acts as a lubricant and serves to bind the particles together in the green state after drying and prior to sintering. The slurried mixture is extruded into a hollow tube utilizing an ultrasonically activated extruder. The tubes are now in their green state and include the plasticizer and binder. The latter are removed by drying and sintering the tubes. Thereafter, the sintered tubes are cold worked as by draw reduction to increase density and mechanical properties. Cold working in accordance with the present invention can be attained utilizing an ultrasonically activated draw bench.

The process of the present invention reduces the number of steps and the costs involved in producing good quality tubing. Tubing produced by the present invention is capable of withstanding corrosive atmospheres, elevated temperatures, a high velocity flow and turbulence, high applied stresses, vibration, fatigue, etc., and generally equals the performance of tubing made from wrought metals. The extruding step may be continuous or interrupted as desired.

As above mentioned, the powdered metals may be elemental such as powdered molybdenum, powdered nickel, etc. The powdered metals may involve a mixture of two or more elemental metals such as powdered copper and powdered nickel. Also, the mixture may involve powdered alloys such as alloys of copper and nickel in powdered form. The step of extruding the mixture utilizing an ultrasonically activated extruder provides for certain advantages not otherwise attainable by other production techniques. Ultrasonic extrusion facilitates the reduction of the amount of binder, plasticizer, lubricant, or other secondary ingredients, thereby causing less deformation (shrinkage and distortion) on drying and sintering; e.g., providing better draw stock. The reduction of binding, plasticizing, and lubricating agents also permits attainment of a higher density in the sintered product. Ultrasonically activated extruders permit the extrusion of materials which are not otherwise extrudable, or substantially reduce the force needed to effect an extrusion.

The sintered product resulting from the ultrasonic extrusion process has a density approaching theoretical densities but it is still porous, of limited ductility, and low in physical strength. Cold working or wroughting of the sintered product is necessary to increase the product properties to duplicate those of conventional molten cast or extruded metallic members. To achieve these properties, a density equivalent to theoretical should be obtained.

The densification or cold working of a sintered product can be accomplished by well-known rolling techniques or cold drawing. The forces involved in these processes produce internal stresses in the metallic product which, due to its extremely limited ductility, may result in product cracking or complete failure. It is therefore important to introduce the metal reduction or working with the minimum of loading.

The application of ultrasonic rolling or ultrasonic cold drawing to the cold-working process will markedly reduce the externally applied loading, and therefore the internal stress, to produce a given increment of material deformation. The material deformation will increase the sintered product density to approximately theoretical density by removing the voided percentage of the product volume caused by removal of the binder and plasticizing materials during the drying and sintering process. The deformation will also impart cold work to the metallic product and result in an increase in the mechanical properties of the material. As the cold work is introduced by successive cold reductions, as during ultrasonic cold drawing, intermediate annealing in the temperature range 600° C.–850° C. will be required to restore ductility and allow further reduction.

It should be further noted that the percentage of binder and plasticizing materials having been minimized through ultrasonic extrusion, the sintered product will exhibit a high density and a minimal degree of shrinkage and distortion, therefore requiring considerably less deformation or cold working to obtain the finished product of theoretical density and of final cross section. With the reduced forces associated with ultrasonic cold rolling or ultrasonic drawing, the desired quality product may be achieved by only a single- or dual-stage cold-working process. In addition, it has been shown that ultrasonic cold working, and particularly ultrasonic drawing, can increase drawing speeds while reducing tube breakage, can provide for improved surface finish or dimensional control, and can permit the drawing of metals which are not otherwise capable of being drawn.

The resultant continuous-process extruded, dried, sintered, and cold-worked metal product, which can currently be produced only in discrete lengths through a multiplicity of fabricating processes, exhibits all the inherent advantageous properties of cast-and-worked metal products at a reduced cost.

It is an object of the present invention to provide a novel process for producing elongated objects from powdered metal.

It is another object of the present invention to provide a novel process for producing hollow tubing from powdered metal.

It is another object of the present invention to provide a novel process for producing hollow tubing from at least two powdered metals.

It is another object of the present invention to provide a method for economically producing superior quality tubing with longer service life and at a lower cost from powdered metals.

Other objects will appear hereinafter.

For the purpose of illustration there is shown in the drawings one embodiment of the extrusion apparatus, it being understood, however, that the apparatus is not limited to the precise arrangement and instrumentalities shown.

FIG. 1 is a longitudinal sectional view through one embodiment of an ultrasonic extrusion apparatus utilized in the present invention.

FIG. 2 is a transverse section taken along 2—2 in FIG. 1.

FIG. 3 is a cross-sectional enlargement of the mandrel apparatus illustrated in FIG. 1.

Reference should be had to U.S. Pat. No. 3,203,215 entitled "Ultrasonic Extrusion Apparatus" incorporated herein by reference, wherein the ultrasonic excitation of the extrusion die is disclosed.

Referring now to the drawings in detail, wherein like numerals indicate like elements, there is shown an ultrasonically excited mandrel identified generally as 10. The mandrel 10 is disposed at one end within extrusion die 12 and supported at its other end by support structures 14, 16, 18 and 20 described below. Vibratory energy is delivered to mandrel 10 from transducer 22 (disclosed in U.S. Pat. No. 3,283,182) via coupler 24 and curved wave guide 26, which carries vibratory energy as a copper wire carries electrical energy. Transducer 22 is mounted within housing 28 by way of a force-insensitive mount 30 (see U.S. Pat. Nos. 2,891,178 and 2,891,180). Coupler 24 is acoustically dimensioned such that the vibratory displacement amplitude of transducer 22 is mechanically transformed via the converging taper of said coupler, thus reducing the vibratory force reaching mandrel 10 through spider 18. Spider 18 is disposed within the main channel through which the material to be extruded approaches mandrel 10 and die 12. Curved wave guide 26 may be any integral number of acoustic half wavelengths long in the material of construction and at the operating frequency of the transducer. Adjustment of the straight acoustic length of wave guide 26 must be made to compensate for curvature, as set forth in U.S. Pat. No. 3,166,840. Said curved wave guide 26 must not contact any metal members along its length, as such contact will short the acoustical circuit and dissipate vibratory energy and reduce the effectiveness of vibratory drive in mandrel 10.

Referring to FIG. 3, wave guide 26 is coaxial with mandrel 10 and is mechanically attached via a nut to the vibratory drive point of mandrel 10. Mandrel 10 is supported within mount 16 attached to structural support 14. Support 14 is restrained against and supported by spider 18, plug 20, and its clamp nut 30.

In operation, the chamber of the extruder on the spider side of piston 32 is filled with the material to be extruded and usually a vacuum is drawn inside the cylinder so that entrapped air is removed from the material to be extruded. Force is applied to piston 32 by any practical hydraulic, pneumatic, or mechanical means to piston rod 34. The material is forced toward the die 12 through spider 18, around mandrel support structures 16, 14, 18, and 30, and through the annular orifice created by mandrel 10 and die 12, while said mandrel and said die undergo ultrasonic vibration independent of each other.

The sequence of steps in practicing the present invention includes mixing ingredients, extruding the ingredients utilizing an ultrasonically activated extruder, drying and sintering at elevated temperatures and controlled atmospheres, and then cold working.

The examples illustrate the independence of the power and frequency associated with the vibratory excitation of mandrel 10 and die 12. Vibratory power delivered by said mandrel and said die is best determined by brief scouting experiments with the power levels delivered to both systems, which is readily done by anyone capable of operating an extruder.

EXAMPLE I

Powdered elemental molybdenum of 3 to 5 micron particle size was mixed with a plasticizer/binder in the following proportions: 200 grams of Superloid or equivalent, 950 grams of water, and 6485 grams of molybdenum powder. Uniform mixing was attained in a blender. The water content by chemical analysis was 10.35 percent by weight.

The mixture was extruded through an ultrasonically activated extruder. A typical ultrasonically activated extruder is shown in U.S. Patents 3,203,215 and 3,002,614. The ram travel was 1 inch per minute, the mandrel over which the tube was extruded was activated with an ultrasonic input of 70 watts at 50 kHz. while the die was activated with an ultrasonic input of 350 watts at 20 kHz., the extrusion force was 6.5 tons, and the extrusion rate was 160 inches per minute.

The pH of the powdered metal should be nearly neutral. If the pH of the powdered metal is highly acidic, it may attack the Superloid binder which will have the effect of producing tubes with low green strength.

The thusly extruded molybdenum tubes were then dried on a porous support to prevent warping and sintered as follows. The tubes were sintered at 1600° C. for two hours in hydrogen saturated with water at approximately 40° C. The tubes were then heated in an atmosphere of flowing hydrogen. They reached temperature in 35 minutes. The first hour at 1600° C. was in flowing hydrogen and the second hour in static hydrogen. The samples were then furnace cooled under argon. The density of the sintered tubing varied between 92 and 94 percent of theoretical density. At this density, molybdenum may be given minimum working to produce satisfactory properties. The ultrasonically extruded tubing had adequate strength and rigidity so that it could be processed through the sintering furnace without major loss of size and shape.

To improve the density and cold working properties, the molybdenum tubing is preferably cold drawn utilizing an ultrasonically activated draw bench apparatus such as that disclosed in U.S. Patents Nos. 3,295,349; 3,209,573; 3,212,312; or 3,212,313, but may be ultrasonically rolled utilizing the apparatus disclosed in U.S. Patent No. 3,096,672. The above-mentioned molybdenum tubing had an OD of .3 inch and an ID of .25 inch. Tube dimensions should be chosen so as to be near enough to the finished dimensions so that only one or not more than two or three passes through the draw bench apparatus are required in order to introduce adequate cold work to produce the desired end product mechanical properties and so as to increase the density sufficiently to insure leaktight integrity.

EXAMPLE II

Example I was repeated using a reclaimed (by the Mond carbonyl process) nickel powder of the same (nominal 5 micron) particle size. The batch or mixture was first made up using 180 grams of a Superloid binder, 428 grams of water, and 4392 grams of powdered nickel. This mixture was too wet and was therefore dried so as to obtain a moisture content of 12.85 percent by weight. The mixture was then extruded using an ultrasonic input of 700 watts at 20 kHz. on the die so as to extrude a solid rod.

The thusly extruded nickel rod was then dried and sintered at 1300° C. for one hour under a hydrogen atmosphere. The same was preheated to 1100° C. in 25 minutes at an initial pressure of .08 micron. The pressure was increased to 14 microns. The power was reduced and hydrogen was introduced to 1½ p.s.i. positive pressure. Treatment was completed under flowing hydrogen after taking one hour and three minutes to reach 1300° C. The rod was furnace cooled under argon. The rod had a density of 87.6 percent of theoretical with minute voids being observable.

Cold working to improve mechanical properties and surface finish is attained by repeating the above-mentioned step of drawing using an ultrasonically activated draw bench.

EXAMPLE III

Example II was repeated using 15 micron average particle size nickel powder mixed with 3–5 micron nickel powder and extruded into rod and tube. After sintering in hydrogen atmosphere, 92 to 94 percent of theoretical density was attained. (This shows how a mixed particle size can be used to obtain increased density.)

EXAMPLE IV

Example I was repeated using in place of molybdenum powder a metal powder mixture of 90 percent electrolytic copper and 10 percent nickel powder of 100 mesh grade with a 35 percent or more −325 mesh fraction. Carbowax was used as the plasticizer/binder. The mandrel was activated with an ultrasonic input of 80 watts at 50 kHz. while the die was activated with an ultrasonic input 1000 watts at 15 kHz. The temperature of the sintering step may vary from 800° C. to 1000° C. for a period of one hour. Substantially the same parameters prevail for the remaining characteristics of the drying and sintering as well as the cold working steps.

EXAMPLE V

Example IV is repeated using a metal powder mixture of 70 percent copper and 30 percent nickel in the same particle size distribution. Starch glyceride is used as the plasticizer/binder. Substantially, the same parameters prevail.

EXAMPLE VI

Example IV is repeated using a powder of 90 percent copper and 10 percent nickel alloy which had been previously alloyed by heating at 800° C. for two hours in hydrogen, pulverized and annealed at 600° C. for ½ hour in hydrogen. This powder (particle size as in Example IV) is then ultrasonically extruded, sintered, and ultrasonically drawn using essentially the same parameters as are in Example IV.

The transducer system used in the extruder and draw bench apparatus is preferably of the electrostrictive ceramic type such as that disclosed in U.S. Pat. 3,283,182. Transducer systems of the magnetostrictive nickel-stack-type may be used. However, ceramic type transducer systems are preferred since at the same electrical input they can have an acoustical power output more than double that attainable by magnetostrictive nickel-stack-type systems. Frequency may vary between 5,000 cycles per second and 100,000 cycles per second. A preferred range of operating frequencies is between 15,000 cycles per second and 40,000 cycles per second.

Superloid, mentioned above as the binder, is a trademark for ammonium alginate. It will be obvious to those skilled in the art that a wide variety of binders may be utilized including starch, starch glyceride (4 parts starch to 12 parts glycerine), polyvinyl alcohols, Carbowax (polyoxyethylene glycol), furfuryl alcohol resins, and polyvinyl acetate. While water has been used as the plasticizer, it will be appreciated by those skilled in the art that Carbowax, oils, and other liquids may be utilized as a plasticizer/binder. Those skilled in the art will recognize that other metal powders may be utilized in practicing the present invention other than those referred to above.

The superimposition of ultrasonic activation on the cold extrusion process together with the lowered plasticizer and binder content results in a denser green compact which upon sintering yields a product closer to the theoretical density, a product which has less residual porosity, and a product having maximum resistance to notch effects.

As a general guide in the mixing of the ingredients prior to extrusion, the metal powder will be about 85 percent by weight, the plasticizer about 12 percent by weight, and the binder about 3 percent by weight. These percentages of binder and plasticizer are approximately half those which would be necessary in order to extrude the mixture without the use of ultrasonics.

The disclosures in the above-mentioned patents are incorporated herein by reference.

The present invention may be embodied in other specific forms without departing from the spirit or essential attributes thereof and, accordingly, reference should be made to the appended claims, rather than to the foregoing specification as indicating the scope of the invention.

We claim:

1. A process for producing elongated objects from powdered metal comprising the steps of mixing a powdered metal with a plasticizer and binder, extruding the mixture while in an unheated state through a die while ultrasonically vibrating the die at a frequency of between 5,000 and 100,000 cycles per second, drying and sintering the extruded shape while removing the plasticizer and binder at an elevated temperature under controlled atmosphere conditions, and then cooling the sintered shape.

2. A process in accordance with claim 1 including extruding the mixture through said die in the form of a hollow tube.

3. A process in accordance with claim 2 including the step of cold working the cooled sintered tube to reduce the cross-sectional area of the tube by drawing the same on an ultrasonically activated draw bench apparatus.

4. A process in accordance with claim 3 including using powdered copper and powdered nickel as part of said mixture.

5. A process in accordance with claim 4 wherein said powdered copper is between 10 percent and 30 percent by weight of the powdered metal in said mixture.

6. A process in accordance with claim 3 wherein said powdered metal is an alloy of copper and nickel.

7. A process for producing tubes comprising the steps of mixing powdered metal with a plasticizer and a binder, the weight percent of the plasticizer and binder being less than about 15 percent, extruding the mixture through a die while ultrasonically vibrating the die and a mandrel associated therewith to form a tube, drying and sintering the extruded tube at an elevated temperature while in a hydrogen atmosphere, cooling the sintered tube, and then cold working the tube to reduce the cross-sectional area thereof.

8. A process in accordance with claim 7 wherein said cold working includes drawing the tube.

9. A process in accordance with claim 7 wherein said cold working includes rolling the tube.

10. A process in accordance with claim 7 wherein said cold working of the tube includes drawing the tube using an ultrasonically activated tube drawing apparatus.

11. A process in accordance with claim 7 wherein said cold working of the tube includes rolling the tube using an ultrasonically activated rolling mill.

12. A process in accordance with claim 7 wherein said plasticizer and binder is an aqueous solution of ammonium alginate.

References Cited

UNITED STATES PATENTS

| | | | |
|---|---|---|---|
| 2,246,165 | 6/1941 | Dawihl et al. | |
| 2,384,215 | 9/1945 | Toulmin. | |
| 3,042,594 | 7/1962 | Hauth | 29—420 |
| 3,096,672 | 7/1963 | Jones | 72—242 |
| 3,203,215 | 8/1965 | Jones | 72—253 |
| 3,231,373 | 1/1966 | Marshall | 264—111X |
| 3,233,012 | 2/1966 | Bodine | 264—23 |

FOREIGN PATENTS

| | | |
|---|---|---|
| 688,312 | 3/1953 | Great Britain. |

JOHN F. CAMPBELL, Primary Examiner

D. C. REILEY, Assistant Examiner

U.S. Cl. X.R.

29—420, DIG46, DIG47; 264—23, 69, 111